United States Patent
Bonzini et al.

(10) Patent No.: US 9,811,260 B2
(45) Date of Patent: *Nov. 7, 2017

(54) SYSTEM AND METHOD FOR BALLOONING WITH ASSIGNED DEVICES

(71) Applicant: Red Hat Israel, Ltd., Ra'anana (IL)

(72) Inventors: Paolo Bonzini, Milan (IT); Michael Tsirkin, Ra'anana (IL)

(73) Assignee: RED HAT ISRAEL, LTD, Ra'Anana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/042,023

(22) Filed: Feb. 11, 2016

(65) Prior Publication Data

US 2016/0170653 A1    Jun. 16, 2016

Related U.S. Application Data

(63) Continuation of application No. 13/767,841, filed on Feb. 14, 2013, now Pat. No. 9,311,164.

(51) Int. Cl.
*G06F 3/06* (2006.01)
*G06F 9/50* (2006.01)

(52) U.S. Cl.
CPC .......... *G06F 3/0604* (2013.01); *G06F 3/0631* (2013.01); *G06F 3/0637* (2013.01); *G06F 3/0683* (2013.01); *G06F 9/5016* (2013.01); *G06F 9/5077* (2013.01)

(58) Field of Classification Search
None
See application file for complete search history.

(56) References Cited

U.S. PATENT DOCUMENTS

| | | | |
|---|---|---|---|
| 7,702,843 B1 | 4/2010 | Chen et al. | |
| 7,788,461 B2 | 8/2010 | Rawson, III | |
| 8,145,763 B2 | 3/2012 | Waldspurger | |
| 8,583,875 B1 | 11/2013 | Garthwaite et al. | |
| 2007/0174505 A1 | 7/2007 | Schlansker et al. | |
| 2009/0025006 A1 | 1/2009 | Waldspurger | |
| 2009/0037936 A1 | 2/2009 | Serebrin | |
| 2010/0241785 A1* | 9/2010 | Chen .................. | G06F 9/5016 711/6 |
| 2010/0299667 A1 | 11/2010 | Ahmad et al. | |
| 2011/0138147 A1 | 6/2011 | Knowles et al. | |
| 2012/0072906 A1 | 3/2012 | Tsirkin et al. | |
| 2012/0233435 A1* | 9/2012 | Ben-Yehuda ....... | G06F 9/5077 711/170 |

(Continued)

OTHER PUBLICATIONS

Paolo Bonzini, [Patch] *virtio-balloon spec: provide a version of the "silent deflate" feature that works*, Sep. 7, 2012, 4 pages.

*Primary Examiner* — Sean D Rossiter
*Assistant Examiner* — Stephanie Wu
(74) *Attorney, Agent, or Firm* — Haynes and Boone, LLP

(57) ABSTRACT

A system and method for ballooning with assigned devices includes inflating a memory balloon, determining whether a first memory page is locked based on information associated with the first memory page, when the first memory page is locked unlocking the first memory page and removing first memory addresses associated with the first memory page from management by an input/output memory management unit (IOMMU), and reallocating the first memory page. The first memory page is associated with a first assigned device.

20 Claims, 7 Drawing Sheets

(56) References Cited

U.S. PATENT DOCUMENTS

2012/0331242 A1* 12/2012 Shaikh ................ G06F 12/0261
  711/154
2013/0185480 A1* 7/2013 Newell ................ G06F 12/023
  711/103

* cited by examiner

SYSTEM AND METHOD FOR BALLOONING WITH ASSIGNED DEVICES

RELATED APPLICATION

The present application is a continuation of U.S. patent application Ser. No. 13/767,841, filed on Feb. 14, 2013, the disclosure of which is hereby incorporated by reference in its entirety.

BACKGROUND

The present disclosure relates generally to memory management of virtual operating systems, and more particularly to ballooning with assigned devices.

As the value and use of information continues to increase, individuals and businesses seek additional ways to process and store information. One option is a computing system. Computing systems may vary in complexity from a single processor operating in relative isolation to large networks of interconnected processors. The interconnected processors may be in close proximity to each other or separated by great distances both physically and as distance is measured in computer networking terms. The interconnected processors may also work together in a closely cooperative fashion or in a loose weakly coupled fashion. Because technology and processing needs and requirements may vary between different applications, the structure and arrangement of the computing system may vary significantly between two different computing systems. The flexibility in computing systems allows them to be configured for both specific users, specific uses, or for more general purposes. Computing system may also include a variety of hardware and software components that may be configured to process, store, and communicate information based on the needs of the users and the applications.

Additionally, some examples of computing systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

As computing systems become ever more distributed over the Internet and the "cloud," the boundary between one computer or machine in the computing system and another computer or machine becomes less distinct. In some instances, a single physical computer may play host to more than one computer or machine using virtualization. This provides great flexibility in the computing system as it is not always necessary to arrange systems in terms of a single application being hosted by a single physical server. In virtualization, a system may host multiple virtual machines on the same server. Each of the virtual machines may appear to the rest of the computing system as separate computers or machines, but they may actually be one of many virtual machines being emulated by the same server. This may allow the same server to provide virtual machines running different operating systems and applications as well as to provide different services to different users. As typically configured, each of the physical servers in a virtual environment runs a host operating system that manages the server's hardware and coordinates the use of various computing resources on the server, such as memory, for each of the virtual machines, which are running a virtual or guest operating system. As each of the virtual machines become more complex, management of the computing resources may become more complex as well.

Accordingly, it would be desirable to provide improved systems and methods for managing memory in a virtual environment.

SUMMARY

According to one embodiment, a method of memory ballooning includes inflating a memory balloon, determining whether a first memory page is locked based on information associated with the first memory page, when the first memory page is locked unlocking the first memory page and removing first memory addresses associated with the first memory page from management by an input/output memory management unit (IOMMU), and reallocating the first memory page. The first memory page is associated with a first assigned device.

According to another embodiment, a method of memory ballooning includes receiving a memory balloon inflation request requesting that at least one memory page be made available, identifying a first memory page that may be made available, placing the first memory page in the memory balloon, and preventing use of the first memory page while it is in the memory balloon. The first memory page is associated with an assigned device.

According to yet another embodiment, a non-transitory machine-readable medium including a first plurality of machine-readable instructions which when executed by one or more processors associated with a host operating system are adapted to cause the one or more processors to perform a method including inflating a memory balloon, determining whether a first memory page is locked based on information associated with the first memory page, when the first memory placed in the memory balloon is locked unlocking the first memory and removing first memory addresses associated with the memory from management by an input/output memory management unit (IOMMU), and reallocating the first memory. The first memory placed in the memory balloon is associated with a first assigned device.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
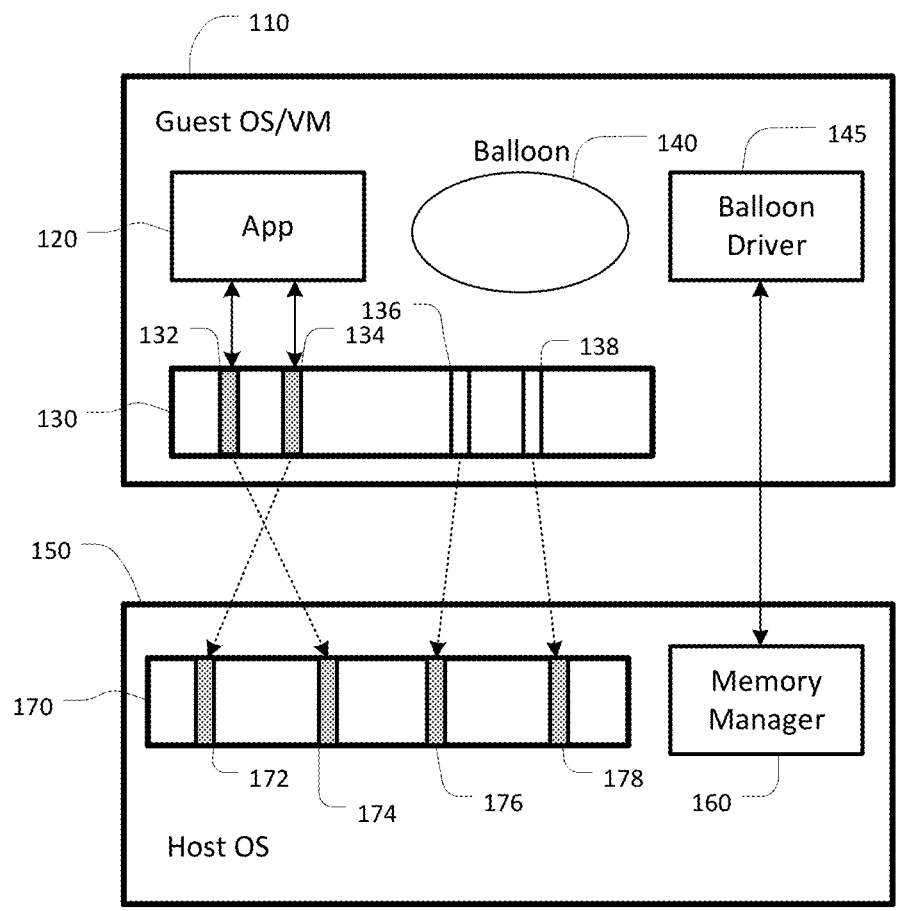
FIG. 1 is a simplified diagram of a memory management system in a virtual environment according to some examples.

FIG. 1 is a simplified diagram of a memory management system in a virtual environment according to some examples. As shown in FIG. 1, a guest operating system (OS) or virtual machine (VM) 110 is executing one or more applications 120. The guest OS further includes guest memory 130, which it is managing. The guest memory 130 is divided into memory pages, which may facilitate the management of the guest memory 130. As shown, the guest memory 130 includes memory pages 132, 134, 136, and 138, although the guest memory 130 may include fewer or considerably more memory pages. The one or more applications 120 are currently accessing memory pages 132 and 134 to store and access data. The memory pages 136 and 138 are not currently being used by any of the one or more applications 120. Although not shown, the memory pages 132, 134, 136, and/or 138 and/or other memory pages in the guest memory 130 may also be part of a virtual memory system that swaps out memory pages to one or more swap files. This may allow the guest OS 110 to emulate more memory capacity than is currently available in the guest memory 130 and is sometimes referred to as memory overcommit because the guest OS 110 may provide more guest memory 130 to the one or more applications 120 than is available in actual memory.

The guest OS 110 further includes a memory balloon 140 being managed by a balloon driver 145. The balloon 140 may allow the guest OS 110 to temporarily make available or loan guest memory 130 back to the operating system that is hosting the guest OS 110 as will be described in further detail below.

Also shown in FIG. 1, is a host operating system 150. The host OS 150 is providing a virtual environment in which the guest OS 110 may operate. The host OS 150 includes, among its many features, a memory manager 160. The memory manager 160 manages host memory 170 for the host OS 150 as well as the memory allocated to virtual machines and guest operating systems such as the guest memory 130 provided to the guest OS 110. The host memory 170 is divided into memory pages that are being managed by the memory manager 160. As shown, the host memory 170 includes memory pages 172, 174, 176, and 178, although the host memory 170 may include fewer or considerably more memory pages. Because the guest memory 130 allocated to the guest OS 110 comes from the host memory 170, each of the memory pages in the guest OS 110 must be mapped to memory pages in the host memory 170. In the example of FIG. 1, guest memory page 132 is mapped to host memory page 174, guest memory page 134 is mapped to host memory page 172, guest memory page 136 is mapped to host memory page 176, and guest memory page 138 is mapped to host memory page 178. This means that when the one or more applications 120 accesses memory pages 132 and/or 134 in the guest memory 130, it is actually accessing the memory pages 174 and/or 172, respectively, in the host memory 170. The memory manager 160 may keep track of how the memory pages are allocated and mapped to prevent one guest OS and/or application from inappropriately accessing and/or writing memory pages allocated to another guest OS and/or application.

Because the memory needs of the host OS 150 and/or guest operating systems, such as the guest OS 110, may change over time, the host OS 150 may require a way to change the amount of memory allocated to each guest OS. In general, this may be accomplished by having the memory manager allocate and deallocate memory to the guest operating systems. In practice, however, this may not be very efficient due to the high overhead associated with the allocation and deallocation processes. Memory ballooning may be a more efficient way to borrow memory pages from one guest OS and make them available for use by another guest OS.

As shown in FIG. 1, the guest OS 110 is configured to support memory ballooning. The guest OS 110 includes the memory balloon 140 and the balloon driver 145. The memory manager 160 of the host OS 150 makes a ballooning request to the balloon driver 145 asking if the host OS 150 may borrow memory pages from the guest OS 110. As the host OS 150 requests more memory pages for the balloon 140, the balloon 140 inflates. Once the guest OS 110 receives the ballooning request, it may satisfy the request by placing the necessary number of memory pages into the balloon 140. In doing so, the guest OS 110 is releasing these memory pages for use by the host OS 150, and the guest OS 110 further refrains from using those memory pages while those memory pages are in the balloon 140.

Figure 2:
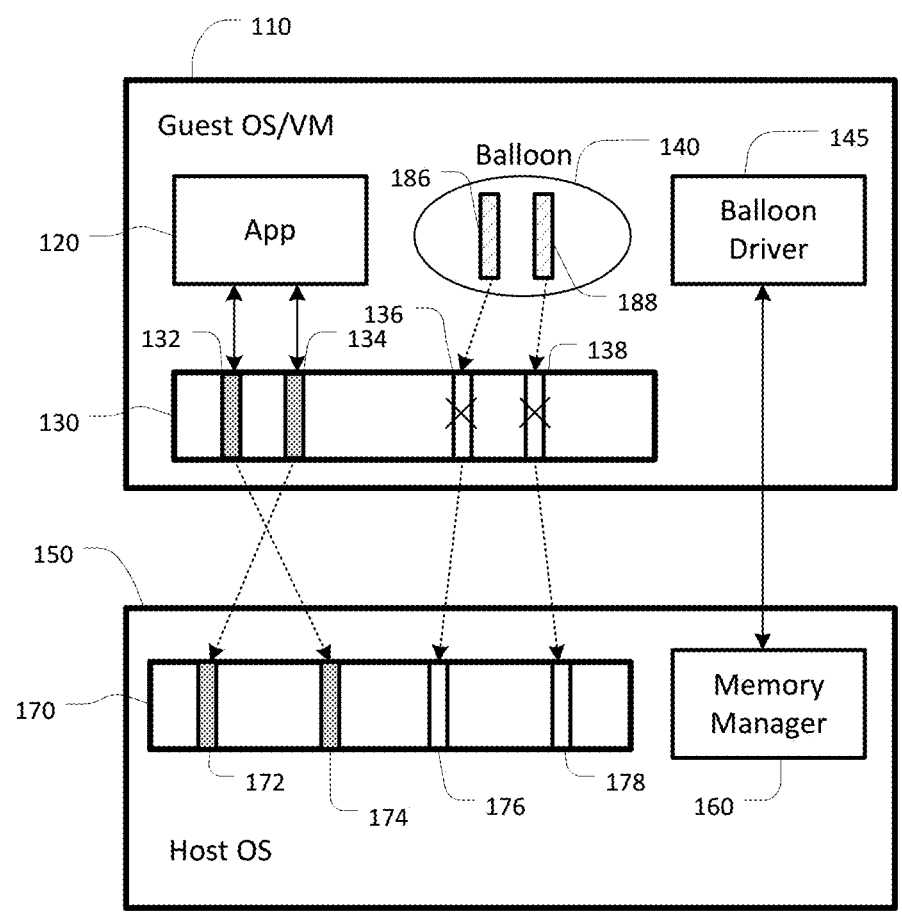
FIG. 2 is a simplified diagram of the memory balloon of FIG. 1 with two memory pages placed therein according to some examples.

FIG. 2 is a simplified diagram of the memory balloon 140 of FIG. 1 with two memory pages placed therein according to some examples. As shown in FIG. 2, the memory balloon 140 includes the ballooned memory pages 186 and 188, which correspond to the memory pages 136 and 138 of the guest memory 130. Because the memory pages 136 and 138 are placed in the balloon 140 as the ballooned memory pages 186 and 188, the guest OS 110 has designated the memory pages 136 and 138 as unavailable and will not allow the one or more applications 120 and/or other processes of the guest OS 110 to use the memory pages 136 and 138 until they are removed from the balloon 140. As a further result of ballooning the memory pages 136 and 138, the corresponding memory pages 176 and 178 in the host memory 170 are made available as needed by the host OS 150. In some examples, the host OS 150 may begin to use memory pages 176 and 178 for its own processes and/or make them available for use by other guest operating systems. At a later time, when the memory pages 176 and 178 are no longer needed and are not being used, the host OS 150 may release the memory pages 176 and 178 making the memory pages 136 and 138 again available for use by the guest OS 110 and its one or more applications 120.

As discussed above and further emphasized here, FIG. 2 is merely an example, which should not unduly limit the scope of the claims. One of ordinary skill in the art would recognize many variations, alternatives, and modifications. According to some examples, the balloon 140 may include fewer than two or more than two memory pages.

Figure 3:
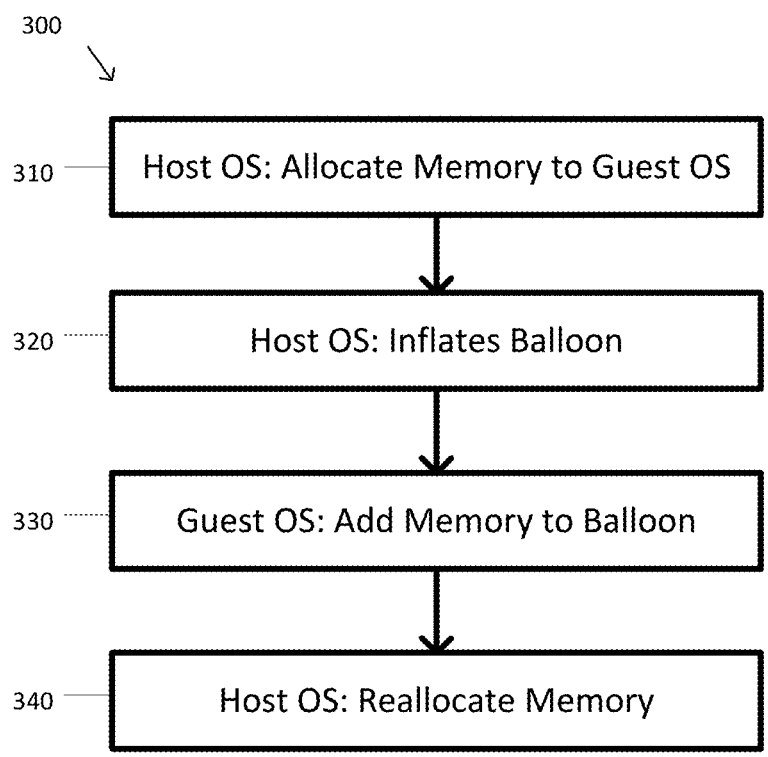
FIG. 3 is a simplified diagram of a method of memory ballooning according to some examples.

FIG. 3 is a simplified diagram of a method 300 of memory ballooning according to some examples. As shown in FIG. 3, the method 300 includes a process 310 for a host OS to allocate memory to a guest OS, a process 320 for a host OS to inflate a memory balloon, a process 330 for a guest OS to add memory to the balloon, and a process 340 for a host OS to reallocate the memory. According to certain examples, the method 300 of memory ballooning can be performed using variations among the processes 310-340 as would be recognized by one of ordinary skill in the art. In some examples, one or more of the processes 310-340 of method 300 may be implemented, at least in part, in the form of executable code stored on non-transient, tangible, machine readable media that when run by one or more processors associated with a computing system may cause the one or more processors to perform one or more of the processes 310-340.

At the process 310, the host OS allocates memory to the guest OS. During provisioning, the host OS allocates a portion of the host memory to the guest OS for use by the guest OS and the applications of the guest OS. In the examples of FIG. 1, the host OS 150 has allocated at least the memory pages 172, 174, 176, and 178 to the guest OS 110 as the memory pages 132, 134, 136, and 138.

At the process 320, the host OS inflates the memory balloon. By inflating the memory balloon, the host OS is requesting that the guest OS make one or more of the allocated memory pages available for use by the host OS. The host OS may request fewer or more memory pages from a guest OS by controlling the amount of inflation in the balloon. In the examples of FIG. 2, the host OS 150 has inflated the balloon 140 to request the loan of the two memory pages 186 and 188. In some examples, the host OS 150 may inflate the balloon 140 by having its memory manager 160 make an inflation request to the balloon driver 145 of the guest OS 110.

At the process 330, the guest OS adds memory to the balloon. By adding memory pages to the balloon, the guest OS is making those memory pages available for use by the host OS. During the time the memory pages are in the balloon, the guest OS should prevent use of those memory pages by the guest OS or any of its applications. In some examples, the guest OS may have the memory pages swapped out to one or more swap files so that any data stored in those memory pages may later be recovered for use by the guest OS and its applications using other memory pages and/or after the memory pages are removed from the balloon. In the examples of FIG. 2, the memory pages 136 and 138 have been added to the memory balloon 140.

At the process 340, the host OS reallocates the memory. Once the guest OS has placed memory pages in the balloon, the host OS may now use those memory pages as needed for the host OS, one or more applications of the host OS, and/or for other guest operating systems. In the examples of FIG. 2, the host OS 150 may reallocate the memory pages 176 and 178.

Although not shown in FIG. 3, once the host OS is done using the ballooned memory pages, it may release them by having the balloon deflated. Once the balloon is deflated, the guest OS may remove the memory pages from the balloon and begin reusing them normally.

Figure 4:
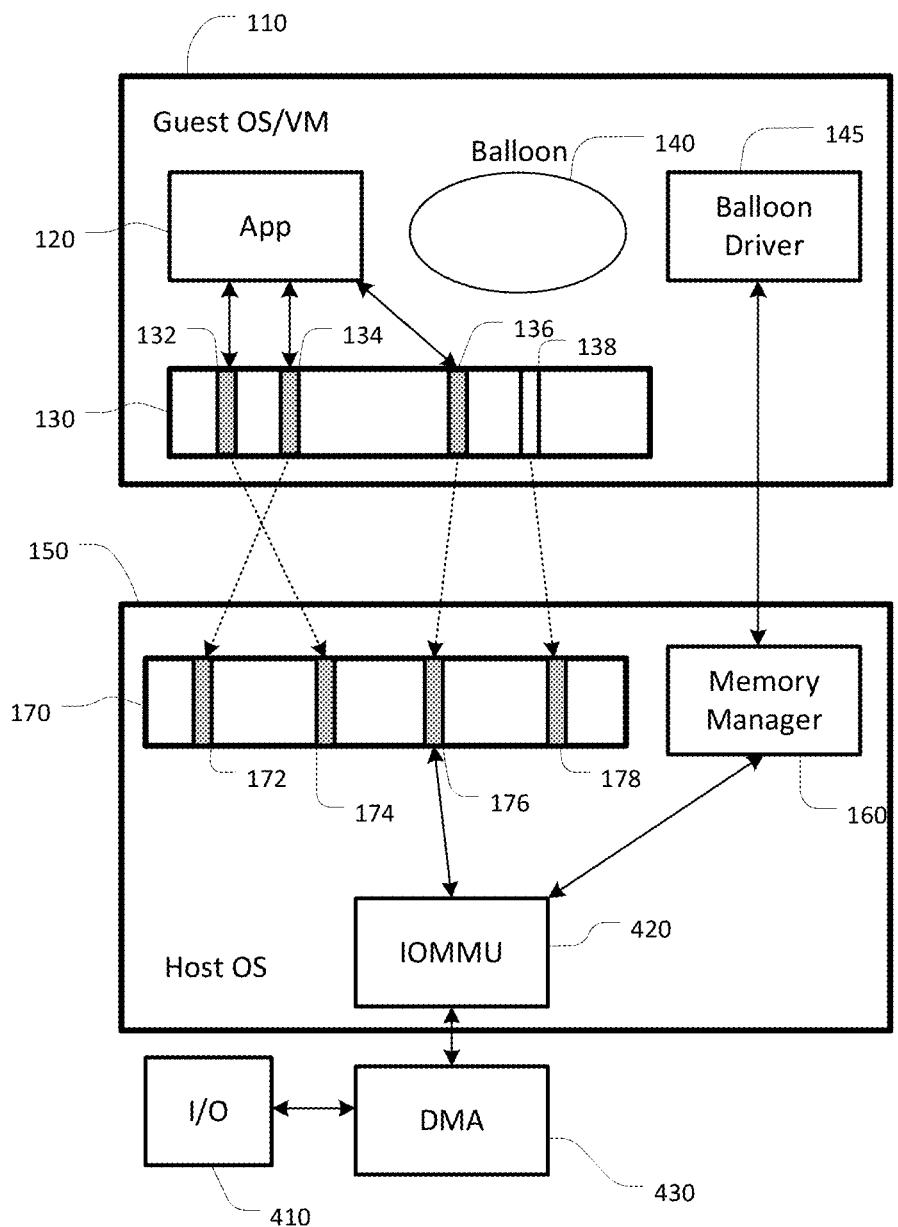
FIG. 4 is a simplified diagram of a memory management system in a virtual environment with an assigned device according to some examples.

FIG. 4 is a simplified diagram of a memory management system in a virtual environment with an assigned device according to some examples. As shown, FIG. 4 includes most of the same memory management system as shown in FIG. 1. The guest OS 110 includes the one or more applications 120 which are accessing the guest memory 130 through memory pages 132, 134, and 136. The guest OS 110 additionally includes the memory balloon 140 and the balloon driver 145. The guest OS 110 is being hosted by the host OS 150 which has allocated portions of its host memory 170 to the guest OS 110. The memory pages 132, 134, 136, and 138 of the guest memory 130 are respectively mapped to the memory pages 174, 172, 176, and 178 of the host memory 170. The host OS 150 further includes the memory manager 160.

As shown in FIG. 4, the memory management system of FIG. 1 is now extended to include an assigned input/output (I/O) device 410. To support the assigned I/O device 410, the host OS 150 may include an I/O memory management unit (IOMMU) 420. The IOMMU 420 may work cooperatively with a direct memory access (DMA) device 430 to coordinate the movement of data between the I/O device 410 and the host memory 170. In the examples of FIG. 4, the DMA controller 410 is configured to transfer data between the I/O device 410 and the memory page 176. Because the memory page 176 is mapped to the memory page 136, the one or more applications 120 in the guest OS 110 may additionally access the data associated with the I/O device 410.

The use of the DMA controller 430 may provide many advantages over providing direct data access to the I/O device 410. In some examples, the DMA controller 430 can more efficiently transfer blocks of data between the I/O device 410 and the memory page 176. The DMA controller 430 may do this by taking control of the memory 170 from the one or more processors running the host OS 150 and transferring data between the memory 170 and the I/O device 410. The DMA controller 430 may do this more efficiently than the host OS 150 because it includes a dedicated data transfer program that does not need to be fetched and decoded as would be required by software being executed by the host OS 150. In some examples, because the DMA controller 430 performs these data transfers to and/or from the memory 170 it may create additional management issues for the host OS 150. In some examples, the data transfer performed by the DMA controller 430 occurs without direct involvement from the host OS 150 so that it is possible that changes are made to the contents of the memory 170, and more specifically the memory page 176, without the direct knowledge of the host OS 150. Thus, in some examples, the memory page 176 should be locked so that it is not swapped out into the one or more swap files. This may be necessary, because the DMA controller 430 may make changes to the memory page 176 at any time.

In the examples of FIG. 4, the IOMMU 420 may help the host OS 150 manage the special needs of the DMA controller 430 and its use of the memory page 176. In some examples, the host OS 150 may notify the IOMMU 420 of the use of the memory page 176 by the DMA controller 430. This allows the IOMMU 420 to remap any memory accesses made by the DMA controller 430 to the memory page 176 as the memory page 176 is moved around within the host memory 170.

Although only the host OS 150 is typically given access to the underlying hardware of the computing system on which it is running, this may not be very efficient for I/O operations. In some examples, if only the host OS 150 has access to the underlying hardware, then all I/O accesses must be passed through the host OS 150 to the guest OS 110 before the one or more applications 120 may access the I/O. In some examples, by assigning the I/O device 410 to the guest OS 110, the host OS 150 is allowing the guest OS 110 and its one or more applications 120 to have more direct access to the I/O device 410. In some examples, the guest OS 110 may have its own device drivers for the I/O device 410. In some examples, the guest OS 110 and the one or more applications may be allocated the memory page 136 that is mapped to the memory page 176 being used by the DMA controller 430 to transfer data to and from the I/O device 410. In some examples, this provides the guest OS 110 and/or the one or more applications 120 with more efficient access to the I/O device 410, but may also limit use of the I/O device 410 to only the guest OS 110.

As discussed above and further emphasized here, FIG. 4 is merely an example, which should not unduly limit the scope of the claims. One of ordinary skill in the art would recognize many variations, alternatives, and modifications. According to some examples, the DMA unit 420 may be part of the host OS 150. According to some examples, the IOMMU 420 may be part of the memory manager 160. According to some examples, the IOMMU 420 and/or the DMA controller 430 may be hardware devices that are separate from the one or more processors running the host OS 150.

Figure 5:
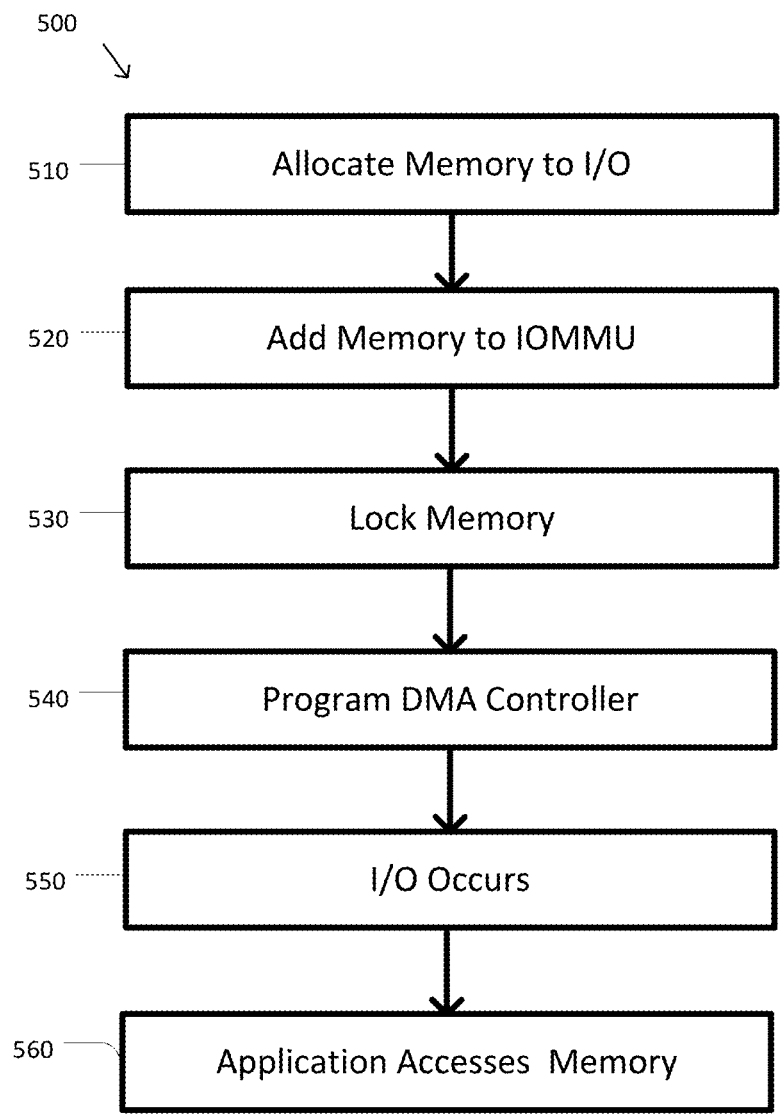
FIG. 5 is a simplified diagram of a method of input/output using an assigned device according to some examples.

FIG. 5 is a simplified diagram of a method 500 of input/output using an assigned device according to some examples. As shown in FIG. 5, the method 500 includes a process 510 for allocating memory to I/O, a process 520 for adding memory to an IOMMU, a process 530 for locking the memory, a process 540 for programming a DMA controller, a process 550 for having I/O occur, and a process 560 for an application to access the memory. According to certain examples, the method 500 of input/output using an assigned device can be performed using variations among the processes 510-560 as would be recognized by one of ordinary skill in the art. In some examples, one or more of the processes 510-560 of method 500 may be implemented, at least in part, in the form of executable code stored on non-transient, tangible, machine readable media that when run by one or more processors associated with a computing system may cause the one or more processors to perform one or more of the processes 510-560.

At the process 510, memory is allocated to I/O. According to some examples, one or more memory pages may be allocated to an I/O device for use as a buffer and/or to support the use of DMA. In the examples of FIG. 4, the I/O device 410 is allocated the memory page 176 for use with the DMA controller 430.

At the process 520, the memory is added to an IOMMU. According to some examples, the IOMMU must be notified of the memory pages allocated during the process 510. In some examples, this allows the IOMMU to remap any accesses made by the DMA controller as the memory pages are mapped by an operating system. In the examples of FIG. 4, the memory page 176 is added to the IOMMU 420 so that accesses by the DMA controller 430 are properly mapped.

At the process 530, the memory is locked. According to some examples, the operating system locks the memory pages allocated during the process 510 so that they are not available for swapping to one or more swap files.

At the process 540, the DMA controller is programmed. According to some embodiments, the DMA controller may be programmed with the addresses and operations necessary to transfer data between an I/O device and the memory pages allocated during the process 510.

At the process 550, I/O occurs. According to some examples, data may be read from and/or sent to the I/O device. In some examples, the data is transferred between the I/O device and the memory, allocated during the process 510, by the DMA controller without the direct involvement of the operating system.

At the process 560, an application accesses the memory. According to some examples, the application desiring access to the I/O device writes data to the memory to have it sent to the I/O device and/or reads data from the memory that has been received from the I/O device. In some examples, the application is being run in a host OS. In some examples, the application is being run in a guest OS. In the examples of FIG. 4, the one or more applications 120 are accessing the memory page 136 from within the guest OS 110.

In some examples, the use of the assigned I/O device 410 may add complications to memory ballooning. In some examples, even though the guest OS 110 may believe that it can make the memory page 136 available for ballooning, the parallel use of the memory page 136 by the DMA controller 430 through the corresponding memory page 176 may make the memory page 176 unavailable for reallocation by the host OS 150. Thus, even if the guest OS 110 adds the memory page 136 to the balloon 140, the host OS 150 may not be able to take advantage of it and the purpose for performing the ballooning is frustrated. Thus, it would be advantageous to adapt the memory ballooning methods of FIG. 3 to address the special needs of assigned devices, such as the I/O device 410.

Figure 6:
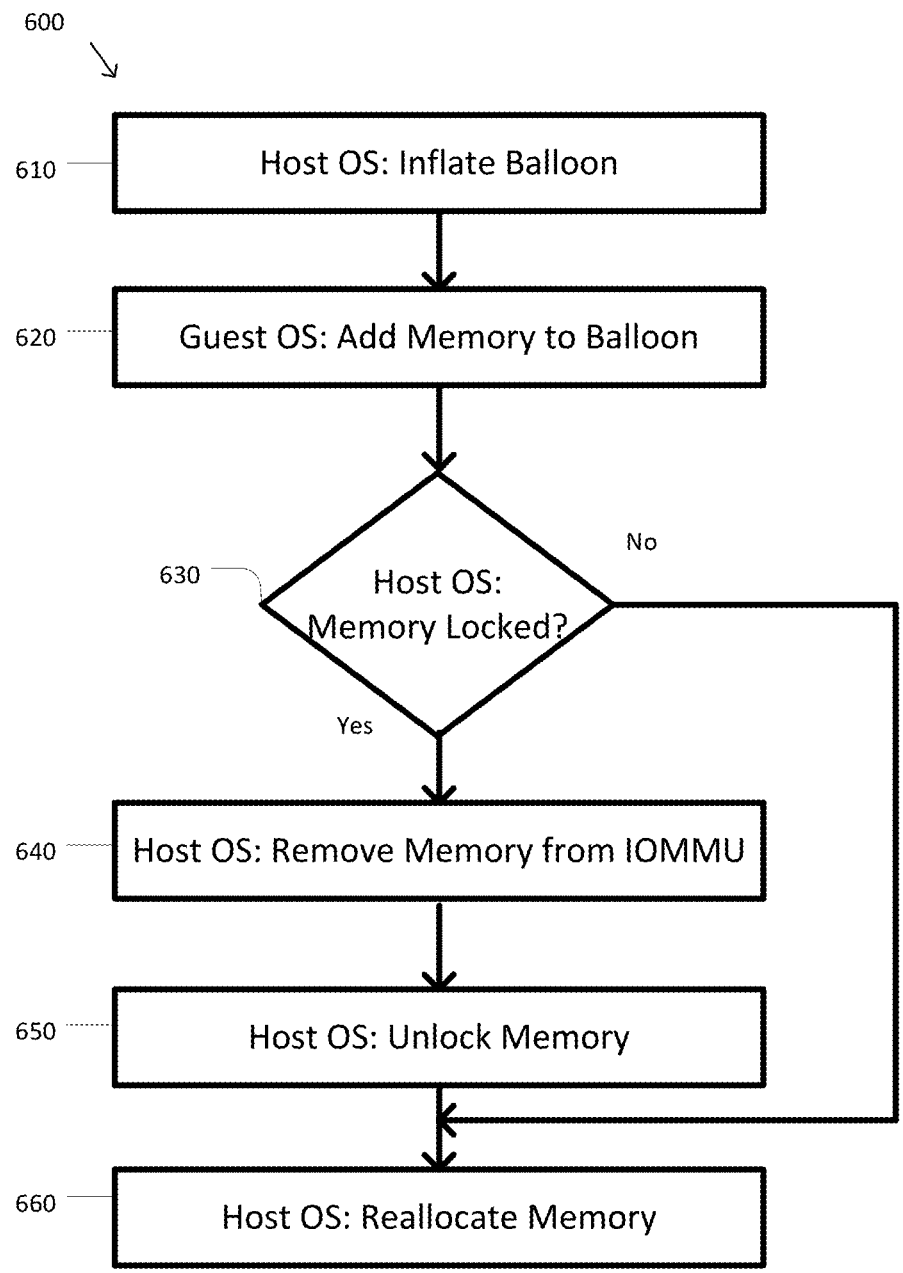
FIG. 6 is a simplified diagram of a method of adding memory to a balloon that is associated with an assigned device according to some examples.

FIG. 6 is a simplified diagram of a method 600 of adding memory to a balloon that is associated with an assigned device according to some examples. As shown in FIG. 6, the method 600 includes a process 610 for a host OS to inflate a balloon, a process 620 for a guest OS to add memory to the balloon, a process 630 for the host OS to determine if the memory is locked, a process 640 for the host OS to remove memory from an IOMMU, a process 650 for the host OS to unlock the memory, and a process 660 for the host OS to reallocate the memory. According to certain examples, the method 600 of adding memory to a balloon that is associated with an assigned device can be performed using variations among the processes 610-660 as would be recognized by one of ordinary skill in the art. In some examples, one or more of the processes 610-660 of method 600 may be implemented, at least in part, in the form of executable code stored on non-transient, tangible, machine readable media that when run by one or more processors associated with a computing system may cause the one or more processors to perform one or more of the processes 610-660.

At the process 610, the host OS inflates a memory balloon. By inflating the memory balloon, the host OS is requesting that the guest OS make one or more of the allocated memory pages available for use by the host OS. The host OS may request fewer or more memory pages from the guest OS by controlling the amount of inflation in the balloon. In the examples of FIG. 2, the host OS 150 has inflated the balloon 140 to request the loan of the two memory pages 186 and 188. In some examples, the host OS 150 may inflate the balloon 140 by having its memory manager 160 make an inflation request to the balloon driver 145 of the guest OS 110.

At the process 620, the guest OS adds memory to the balloon. By adding memory pages to the balloon, the guest OS is making those memory pages available for use by the host OS. During the time the memory pages are in the balloon, the guest OS should prevent use of those memory pages by the guest OS or any of its application. In some examples, the guest OS may have the memory pages swapped out to one or more swap files so that any data stored in those memory pages may later be recovered for use by the guest OS and its applications after the memory pages are removed from the balloon. In the examples of FIG. 2, the memory pages 136 and 138 have been added to the memory balloon 140.

At the process 630, the host OS determines if the memory is locked. When the memory is locked, the host OS must use the processes 640 and 650 before reallocating the memory in the process 660. In some examples, the memory may be locked when the memory is being accessed using DMA as memory being associated with an assigned device. In the examples of FIG. 4, if the guest OS 110 adds the memory page 136 to the balloon 140 during the process 620, the host OS 150 may determine that the corresponding memory page 176 is locked because it is being accessed by the DMA controller 430 to support data transfers to and from the assigned I/O device 410.

At the process 640, the host OS removes the memory from the IOMMU. In some examples, by removing the memory from the IOMMU, the host OS may remove any address mapping being used to support I/O and DMA. In some examples, by removing the address mapping, this may prevent a DMA controller from accessing the ballooned memory.

At the process 650, the host OS unlocks the memory. In some examples, the host OS may unlock the memory so that the memory may be swapped out to one or more swap files. In some examples, the host OS may unlock the memory to indicate that it is no longer associated with the assigned device. In some examples, the process 650 may be performed before and/or in parallel with the process 640. In the examples of FIG. 4, after the processes 640 and 650, the memory page 176 is now available for reallocation during the process 660.

At the process 660, the host OS reallocates the memory. The host OS may now use the memory as needed for the host OS, one or more applications of the host OS, and/or for other guest operating systems. In the examples of FIGS. 2 and 4, the host OS 150 may reallocate the memory pages 176 and 178, which correspond to the memory pages 186 and 188 placed into the balloon 140 by the guest OS 110 even though the memory page 176 may have been associated with the assigned I/O device 410.

Figure 7:
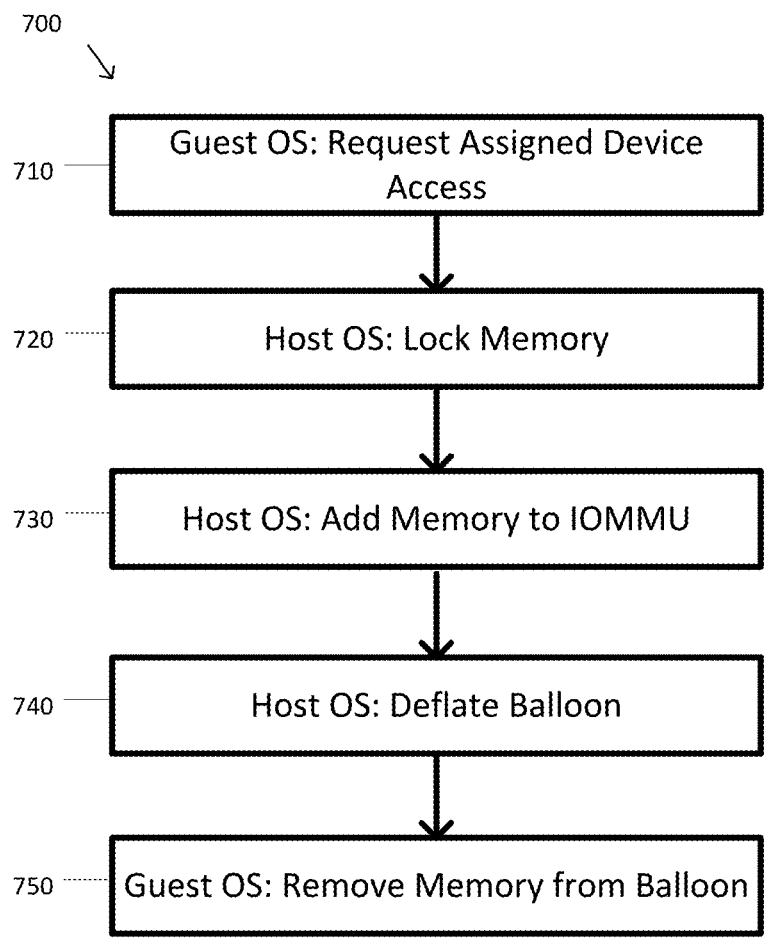
FIG. 7 is a simplified diagram of a method of removing memory from a balloon and associating it with an assigned device according to some examples.

FIG. 7 is a simplified diagram of a method 700 of removing memory from a balloon and associating it with an assigned device according to some examples. As shown in FIG. 7, the method 700 includes a process 710 for a guest OS to request access to an assigned device, a process 720 for a host OS to lock memory, a process 730 for the host OS to add the memory to the IOMMU, a process 740 for the host OS to deflate a balloon, and a process 750 for the guest OS to remove the memory from the balloon. According to certain examples, the method 700 of removing memory from a balloon and associating it with an assigned device can be performed using variations among the processes 710-750 as would be recognized by one of ordinary skill in the art. In some examples, one or more of the processes 710-750 of method 700 may be implemented, at least in part, in the form of executable code stored on non-transient, tangible, machine readable media that when run by one or more processors associated with a computing system may cause the one or more processors to perform one or more of the processes 710-750.

At the process 710, a guest OS requests access to an assigned device. In some examples, the guest OS may need to perform one or more I/O operations using the assigned device. In some examples, by placing memory associated with the assigned device into a balloon, the guest OS knows that it needs to have access to the memory before it can complete additional I/O operations. In some examples, the guest OS may request access to the assigned device indirectly through a device driver associated with the assigned device. According to some examples, the host OS may not grant the request of the guest OS. In some examples, the host OS may place limits on the number of memory pages that the guest OS may have locked for assigned devices.

At the process 720, the host OS locks the memory. In some examples, the host OS may lock the memory so that the memory may not be swapped out to one or more swap files. In some examples, the host OS may lock the memory to indicate that it is now associated with the assigned device.

At the process 730, the host OS adds the memory to an IOMMU. In some examples, by adding the memory to the IOMMU, the host OS may create address mappings that are necessary to support I/O and DMA with that memory. In some examples, by adding the address mapping, this may now allow a DMA controller to accessing the memory. In some examples, the process 730 may be performed before and/or in parallel with the process 720.

At the process 740, the host OS deflates the balloon. By deflating the balloon, the host OS is letting the guest OS know that the associated memory is now available for use by the guest OS. In the examples of FIGS. 2 and 4, the host OS 150 may deflate the balloon 140 by having the memory manager 160 send an appropriate message to the balloon driver 145.

At the process 750, the guest OS removes the memory from the balloon. The memory is now available for use by the guest OS and/or the one or more applications 120. In some examples, the guest OS and/or the one or more applications 120 may resume I/O operations with the assigned device.

Some examples of the guest OS 110 and the host OS 150 may be run on one or more computing systems that may include one or more processors and non-transient, tangible, machine readable media that include executable code that when run by the one or more processors may cause the one or more processors to perform the processes of methods 300, 500, 600, and/or 700 as described above. Some common forms of machine readable media that may include the processes of methods 300, 500, 600, and/or 700 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:
1. A method of memory ballooning, the method comprising:
receiving, by a guest operating system, a memory balloon inflation request requesting that at least one memory page be made available;

identifying, by the guest operating system, a first memory page that may be made available;

placing, by the guest operating system, the first memory page in a memory balloon while the first memory page is locked and the first memory page is being accessed by a direct memory access (DMA) controller; and preventing, by the guest operating system, use of the first memory page by the guest operating system while the first memory page is in the memory balloon;

wherein the first memory page is associated with a first assigned device;

wherein in response to the first memory page being placed in the memory balloon and when the first memory page is locked and is being accessed by the DMA controller the first memory page is unlocked.

2. The method of claim 1, wherein in response to the first memory page being placed in the memory balloon and when the first memory page is locked and is being accessed by the DMA controller first memory addresses associated with the first memory page are removed from management by an input/output memory management unit (IOMMU).

3. The method of claim 1, further comprising preventing, by the guest operating system, use of the first memory page by an application running in the guest operating system while the first memory page is in the memory balloon.

4. The method of claim 1, wherein the memory balloon inflation request is received by a balloon driver from a memory manager of a host operating system.

5. The method of claim 1, further comprising swapping, by the guest operating system, the first memory page into a swap file prior to placing the first memory page in the memory balloon.

6. The method of claim 1, further comprising:

making, by the guest operating system, a request for access to a second memory page associated with a second assigned device;

receiving, by the guest operating system, a balloon deflation message indicating that the second memory page is available; and removing, by the guest operating system, the second memory page from the memory balloon.

7. The method of claim 6, wherein the first assigned device and the second assigned device are the same.

8. The method of claim 6, wherein the first memory page and the second memory page are the same.

9. The method of claim 1, wherein the first assigned device is an input/output device.

10. The method of claim 1, wherein the first memory page is a buffer for the first assigned device.

11. A non-transitory machine-readable medium comprising a plurality of machine-readable instructions which when executed by one or more processors associated with a guest operating system are adapted to cause the one or more processors to perform a method comprising:

receiving a memory balloon inflation request requesting that at least one memory page be made available;

identifying a first memory page that may be made available;

placing the first memory page in a memory balloon while the first memory page is locked and the first memory page is being accessed by a direct memory access (DMA) controller; and preventing use of the first memory page by the guest operating system while the first memory page is in the memory balloon;

wherein the first memory page is associated with a first assigned device;

wherein in response to the first memory page being placed in the memory balloon and when the first memory page is locked and is being accessed by the DMA controller the first memory page is unlocked.

12. The machine-readable medium of claim 11, wherein in response to the first memory page being placed in the memory balloon and when the first memory page is locked and is being accessed by the DMA controller first memory addresses associated with the first memory page are removed from management by an input/output memory management unit (IOMMU).

13. The machine-readable medium of claim 11, wherein the method further comprises preventing use of the first memory page by an application running in the guest operating system while the first memory page is in the memory balloon.

14. The machine-readable medium of claim 11, wherein the memory balloon inflation request is received from a memory manager of a host operating system.

15. The machine-readable medium of claim 11, wherein the method further comprises swapping the first memory page into a swap file prior to placing the first memory page in the memory balloon.

16. The machine-readable medium of claim 11, wherein the method further comprises:

making a request for access to a second memory page associated with a second assigned device;

receiving a balloon deflation message indicating that the second memory page is available; and removing the second memory page from the memory balloon.

17. The machine-readable medium of claim 16, wherein the first assigned device and the second assigned device are the same.

18. The machine-readable medium of claim 16, wherein the first memory page and the second memory page are the same.

19. The machine-readable medium of claim 11, wherein the first assigned device is an input/output device.

20. The machine-readable medium of claim 11, wherein the first memory page is a buffer for the first assigned device.

* * * * *